United States Patent [19]

Kotzin

[11] Patent Number: 5,077,741
[45] Date of Patent: Dec. 31, 1991

[54] DATA THROUGHPUT ENHANCEMENT

[75] Inventor: Michael D. Kotzin, Buffalo Grove, Ill.

[73] Assignee: Motorola, Inc., Schaumburg, Ill.

[21] Appl. No.: 446,279

[22] Filed: Dec. 5, 1989

[51] Int. Cl.$^5$ ............................................. G06F 11/08
[52] U.S. Cl. ........................................ 371/30; 455/33
[58] Field of Search ..................... 455/33; 379/59, 60; 371/30, 37.1, 43

[56] References Cited

U.S. PATENT DOCUMENTS 3,512,150  11/1965  Ohnsorge ........................... 371/37.1
4,519,068   5/1985  Krebs et al. ....................... 455/33 X
4,697,281   9/1987  O'Sullivan ......................... 455/33 X
4,713,817  12/1987  Wei .................................. 371/43
4,888,775  12/1989  Karabed et al. ..................... 371/43
4,998,289   3/1991  Rabe et al. ......................... 455/33

Primary Examiner—Jerry Smith
Assistant Examiner—Russell Cass
Attorney, Agent, or Firm—Shawn B. Dempster; F. John Motsinger

[57] ABSTRACT

A method comprising distributing channel coding on either side of a limited capacity communication path by partially channel coding a signal at a first processing point and communicating the partially coded signal over the communication path to a second processing point. The partially coded signal comprises at least some but not all of the necessary coded bits. The channel coding algorithm is completed at the second processing point using the communicated partially coded signal thereby increasing throughput over the limited capacity path while minimizing added delays.

24 Claims, 2 Drawing Sheets

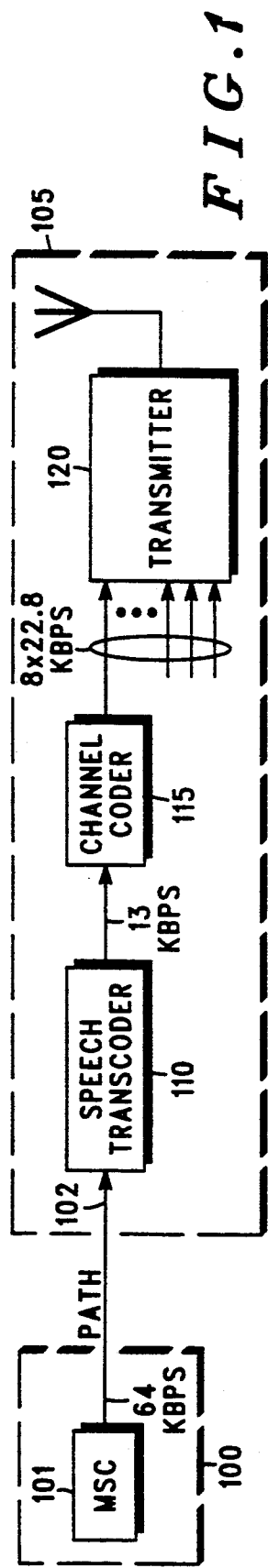
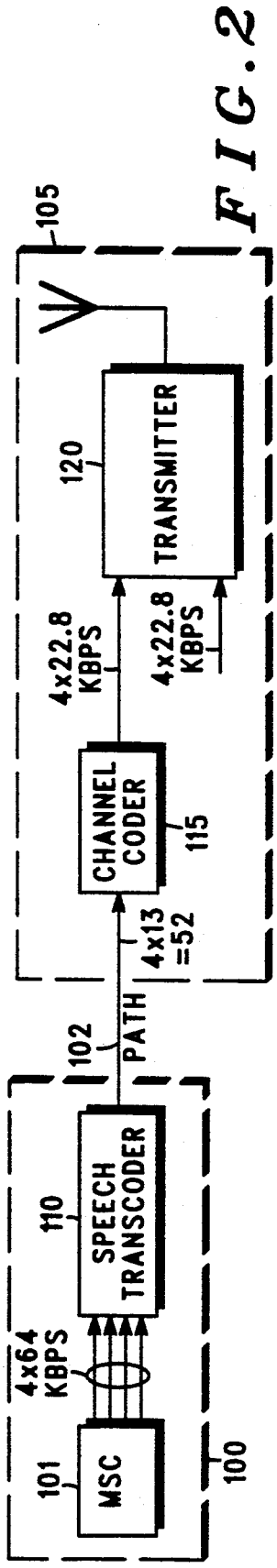
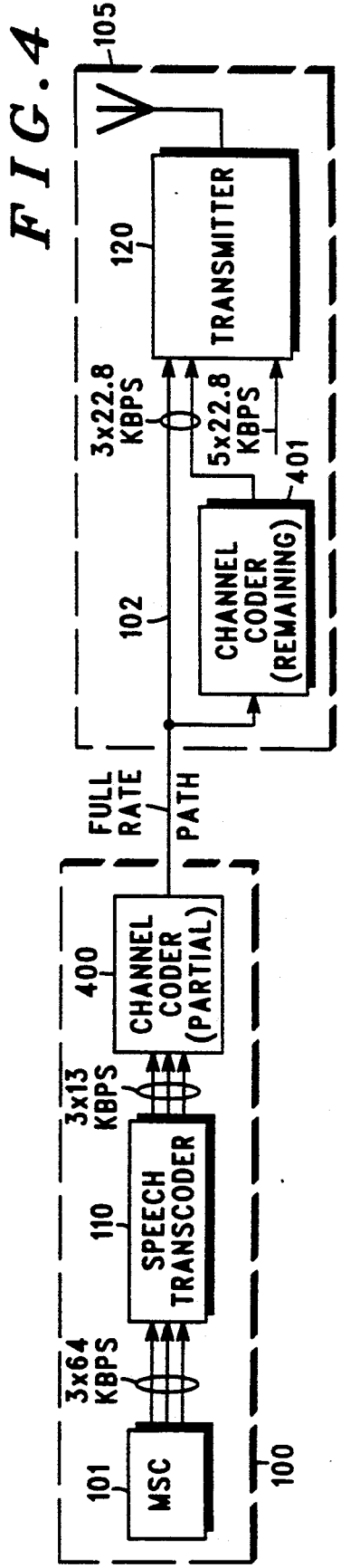

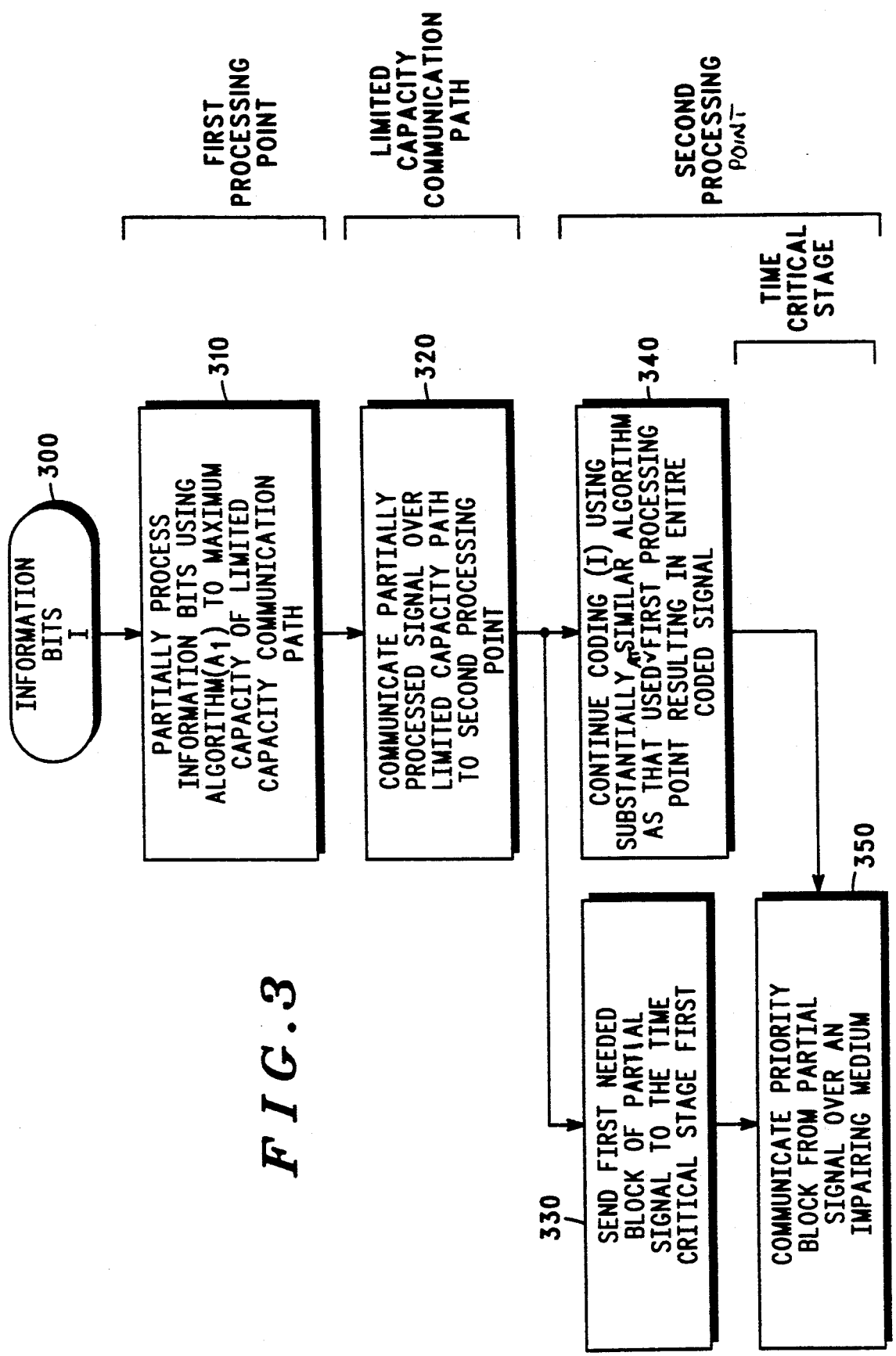

DATA THROUGHPUT ENHANCEMENT

TECHNICAL FIELD OF INVENTION

This invention relates generally to communication systems and more particularly to digital communication systems that employ redundant coding.

BACKGROUND OF THE INVENTION

In communication systems employing information coding, such as forward error correction coding, the number of code bits are increased by adding redundancy to information bits, such as by convolution. Redundancy coding, as known in the art, provides more signal elements than necessary to represent the intrinsic information. Channel coding, a type of redundancy coding, is often employed at the expense of using more channel capacity than might otherwise be necessary, to permit improved information recovery over channels that exhibit impairments, such as mobile radio communication channels. Channel coding is well understood in digital communication theory and is used in digital speech radio communication systems, such as digital radio telephone cellular systems. An information signal, such as digital data or a low bit rate encoded speech signal, is processed into a coded digital signal by some predetermined algorithm, and is hereafter referred to as the processed signal.

In a digital cellular system, a switch site must typically communicate multiple digital voice channels or digital data channels to a cell site over landline interconnections. The cell site in turn transmits these voice channels to mobile subscriber units via radio frequency (RF) channels. In an attempt to improve system performance over such heavily impaired mobile RF channels, the information signals typically undergo channel coding at either the cell site or the switch site (or someplace in between) before they are communicated over the RF channel.

In such digital communication systems, the landline communication paths are expensive to install and maintain; consequently, efficient use of these paths is of utmost importance. However, the performance of the system must also be a consideration so that minimum degradation occurs. The location of where the speech compression and the channel coding are accomplished is an important consideration.

For example, FIG. 1 shows a known method of channel coding speech blocks wherein the switch site (100), comprised of a mobile switching center (MSC) (101) communicates one non-processed 64 kilobit per second (kbps) digitized voice channel over a single 64 kbps channel of a 2.048 Mbps megastream interconnect to a cell site (105). At the cell site, the information on the voice channel is digitally compressed into low bit rate speech information bits by a speech transcoder (110), whose average output data rate is 13 kbps. Some of these speech information bits are then sequentially channel coded by the channel coder (115) resulting in a processed signal of 22.8 kbps per voice that is sent to an RF transmitter (120). This method is not cost effective, since each voice channel requires its own 64 kbps path between the switching center and the cell site.

If, however, all the processing was completed at the switch site, a maximum number of two (22.8 kbps+22.8 kbps=45.6 kbps) integral processed voice channels could be multiplexed onto a single 64 kbps channel of the megastream interconnect. The improvement realized is a reduction by two in the amount of landline capacity required to carry the same number of voices. Excessive landline interconnect costs still exist since only two voices are carried per megastream subchannel.

FIG. 2 depicts a known method for providing four voice channels over one 64 kbps landline megastream subchannel by moving the speech transcoder (110) to the switch site (100) and performing only the speech coding (13 kbps per channel) on all four channels before transmitting over the landline path whereafter the channel coding (processing) is provided at the cell site. Consequently, a 52 kbps (4*13 kbps=52 kbps) speech coded data stream is communicated over the landline connection to the cell site (105) where each voice channel then undergoes channel coding via the channel coder (115) resulting in four 22.8 kbps processed signals. These digital signals are then communicated to the transmitter (120) and transmitted over RF channels.

Unfortunately, this can produce a downlink bulk audio delay since a majority of each speech block (each speech block being 260 bits and representing 20 msec of speech) must be transferred to the cell site before the necessary processing may begin. This is because the channel coded bits generated may each be a function of many of the input information bits. The delay to transfer a block of information is about 17 msec (1040 or (260*4) bits of speech at 64 kbps) and is long enough in duration to be undesirable. Accordingly, there exists a need to maximize processed data throughput over a limited capacity communication path while minimizing delays.

BRIEF SUMMARY OF THE INVENTION

These needs and others are substantially met by the method for data throughput enhancement disclosed below. The method comprises partially processing, such as channel coding, at least a portion of a signal, such as part of a coded speech block, at a first processing point, such as a cellular switch site, resulting in a partially processed signal. The partially processed signal is communicated over a limited capacity communication path to at least a second processing point, such as a cell site, whereafter the signal undergoes continuing processing, such as completing the channel coding commenced at the first processing point, resulting in the processed signal.

The partially processed signal comprises at least a portion of processed bits, such as bits which have been error correction/detection coded and optionally, information bits such as compressed digitized speech. To minimize waiting delays at the at least second point, at least some of the portion of processed bits are those needed first by the second point to continue the processing or to effectuate further data transfer from the second point, such as transmission over a radio channel. The continuing processing generates remaining processed bits at the second processing point using a substantially related algorithm as that used to generate the initial processed bits at the first processing point. The first processing point may partially process the signal up to a level not to exceed the capacity of the communication path.

BRIEF DESCRIPTION OF THE DRAWINGS

FIG. 1 is a block diagram generally depicting one speech channel being transmitted over a limited capacity communication path from a cellular switch site to a cell site whereafter the speech channel is channel coded.

FIG. 2 is a block diagram generally depicting four coded speech channels at the switch site and communicated over a limited capacity communication path to the cell site where they are entirely processed (channel coded) resulting in a transmission path bulk delay.

FIG. 3 is a flow chart depicting the preferred method for data throughput enhancement in accordance with the invention.

FIG. 4 is a block diagram generally depicting three voice channels partially processed (channel coded) at the switch site and communicated over a limited capacity communication path to the cell site wherein the processing (channel coding) is completed resulting in no added transmission path bulk delay in accordance with the invention.

PREFERRED EMBODIMENT OF THE INVENTION

The disclosed invention of distributed coding may be readily applied to a transmitting system, receiving system or any communication system comprising redundant coding techniques. The preferred embodiment of the invention is a method comprising distributing systematic error correction channel coding on either side of a limited capacity communication path in order to maximize throughput over the path while reducing delays in providing the processed signal. This embodiment assumes only an integral number of voice channels are allowed over a single megastream 64 kbps subchannel due to the complexities associated with switching a non-integral number of user channels. However, it is understood that the utility of this invention is not limited by this assumption.

FIG. 3 discloses the preferred method of enhancing data throughput comprising partially processing (coding up) (310) a signal of information bits (300) to an average rate equal to or not to exceed the average rate of the fully processed (coded up) signal, then communicating (320) the partially processed signal over a limited capacity communication path to a second processing point, and continuing processing the signal (340) at the second processing point. The partially processed signal may also be sent with a preferential bit ordering (330) to a time critical stage before the entire processing is completed to effectuate a priority based communication scheme. The partially processed signal or the completely processed signal is then communicated (350) over an impairing medium.

Partially processing (310) comprises algorithmically performing systematic error correction channel coding, as understood in the art, on a signal such as a coded (compressed) speech block, at a first processing point, resulting in a partially processed signal. The partially processed signal therefore comprises at least some bits of the original information signal plus some (but not the complete set) of processed bits. The number of processed bits generated at the first processing point is a function of at least the capacity of the limited capacity communication path and the priority scheme associated with the second processing point.

This allows a maximum amount of data (information bits and some redundant bits) to be communicated over the path (320) in a priority order (if necessary) to allow at least a second processing point to continue processing (340) the signal without waiting for a completely processed signal to first be communicated over the path. Consequently, a first needed partially processed signal may be communicated first to allow a time critical stage (330) to begin utilizing the partially processed signal, such as first transmitting the partially processed data to a subscriber radiotelephone, while a remaining portion of redundant bits is generated by continuing coding (340) of the information bits to facilitate the completion of channel coding.

Continuing coding (340) comprises using the same algorithm as that used in partially coding (310) the signal to algorithmically generate a remaining portion of the needed redundant bits, thereby completing the coding initially started at the first processing point resulting in a completely channel coded signal at the second processing point. Although the same algorithm is used in the preferred embodiment, any substantially related algorithm may also be used to aid in providing the necessary unprocessed input information. For example, a substantially related algorithm may be a non-systematic channel coding algorithm, as understood in the art, the first processing point may algorithmically generate a portion of coded bits and communicate only a portion, if any, of the signal information bits and the coded bits to the second processing point where continuing processing comprises algorithmically deriving the remaining unknown information bits from the partially processed signal. This algorithm may be considered complementary to the algorithm used in partially processing as it completes processing by inferentially deriving information bits based on the subset of coded bits generated by the partially processing algorithm. As appreciated by those skilled in the art, any other suitable coding technique which generates coded bits may also be employed by the disclosed invention. Such techniques are hereby referred to as combinatorial processing techniques. In addition, the method of invention is not limited to one processing point on either side of the limited communication path, but consistently applies for N processing points on either side of the communication path.

The method for data throughput enhancement can be described by applying it to the aforementioned submultiplexing digital cellular radio communication system. FIG. 4 depicts the invention as applied in a three to one (three voice channels to one 64 kbps path) submultiplexed system that uses systematic channel coding to provide redundant error correction/detection bits to a digital speech signal before the signal is transmitted over an RF channel. A transmitter, such as the switch site (100), comprises means for partially processing a signal such as three coded voice channels in its partial channel coder (400) up to a point not exceeding the limited capacity of a communication path (102) and communicates the partially processed speech signals over the limited capacity path (102) to a receiver, such as a cell site (105). The partially processed signal is comprised of portions of the original signal and a subset of the coded bits. Communication is facilitated via means for transmitting comprising interface transceivers as commonly known in the art.

Three voices at 13 kbps coding requires 39 kbps (3*13) of the 64 kbps path. If all processing were performed at the switch site (100), 68.4 kbps would be required (3*22.8 after complete processing). Thus, of the total 29.4 kbps (68.4 kbps−39 kbps) of overhead processing that is needed for the three voices, only an estimated 25 kbps (64 kbps−39 kbps) of the 29.4 kbps can be sent (as understood in the art, some nominal framing bits or side information bits may also detract from the total available 64 kbps throughput) which translates to over 85% of the needed processing for each frame.

Therefore, taking each speech coded frame to be 20 msec (260 bits=13 kbps*20 msec), the first 17 msec (0.85*20 msec) of each voice can be processed by the switch site channel coder (400) and communicated with the speech blocks at full rate over the 64 kbps path to the cell site (105). The total time to transmit the processed signal (over the RF medium) is actually 40 msec due to interleaving, as known in the art, therefore a 17 msec block actually accounts for 34 msec of real time. Consequently, the transmitter (120) has all the information needed to compute the unknown redundant bits 14 msec in advance of when they are needed and the cell site (105) continues the processing in its channel coder (401) and sends the completed processed signals to the transmitter (120) in the order they are needed thereby reducing idle time of the transmitter. Since error coding expends a minimal amount of digital signal processing time, the distributed coding (processing) substantially eliminates the bulk delay at a minimal expense. As a result, three voice channels may be communicated over one path with no appreciable delay.

For purposes of optimizing the invention's performance, it is evident that considerable latitude is available in selecting what type of data and in what order the data may be communicated to the second unit. As a minimum, some but not all of the processed data (redundant data) is communicated. Communication of the original information is not necessary in all cases.

Another embodiment provides a four to one submultiplex system reducing the traditional four to one sub-multiplexing (as depicted by FIG. 2.) delay by substantially reducing the 17 msec bulk audio delay to approximately 8 msec. Applying the same data rates as discussed above, four voices at 13 kbps requires 52 kbps (4*13 kbps) of the 64 kbps path. After complete channel coding, 91.2 kbps would be needed (4*22.8 kbps after channel coding). Thus, of the total 39.2 kbps (91.2 kbps–52 kbps) of the necessary overhead processing for the four voices, only 12 kbps can be sent. This is over 30% of the needed redundant bits. This translates into 12 msec (0.30*40 msec due to interleaving) of the 20 msec of redundant bit time associated with each voice block. Therefore, 8 msec of the complete processed signal is not yet available, and an 8 msec delay must be inserted before the transmission is allowed to begin. As is evident, this is less than half of the delay required compared to the conventional approach. Various other optimizations are also possible to reduce the incurred delay, for example, where all bits need not be present to begin channel coding at the second processing point.

As appreciated by those ordinarily skilled in the art, the invention readily applies to communication systems comprising decoding of a channel coded signal, or any other coded signal, where decoding is distributed on either side of a limited capacity communication path. It will also be appreciated that the invention is not limited to error correction/detection coding algorithms but rather any kind of algorithm involving redundancy, such as information compression/expansion. For example, in a time critical compression/expansion system, a first processing point containing a compressed signal, may partially expand (adding a greater number of bits to the compressed signal) a portion of the compressed signal before communicating a portion of the compressed data along with some expanded data to a second communication unit. The second communication unit may then first use the already expanded portion while it continues to expand the received compressed data. It is further understood that this invention applies to any type of information signal and is not restricted to the voice example described.

What I claim is:

1. A method for facilitating throughput of a signal over a communication path comprising:
    (a) generating a partially processed signal having redundant data by applying a first algorithm to at least a portion of a signal at a first processing point;
    (b) communicating at least a portion of the partially processed signal over a limited capacity communication path to at least a second processing point remotely located from the first processing point; and
    (c) continuing processing of the partially processed signal at the at least second processing point by using a second algorithm whose functional purpose is substantially related to the first algorithm.

2. The method of claim 1 wherein each algorithm comprises a channel coding algorithm.

3. The method of claim 2 wherein each channel coding algorithm comprises a channel coding process selected from the group consisting of systematic linear block coding, nonsystematic linear block coding, systematic convolutional coding, and nonsystematic convolutional coding.

4. The method of claim 1 wherein the step of generating comprises expanding at least a portion of a compressed data signal.

5. The method of claim 1 wherein the step of continuing processing comprises expanding at least a portion of a compressed data signal.

6. The method of claim 1 wherein the step of communicating comprises communicating at least portion of the partially processed signal in an order of priority based on a first needed—first sent basis to the at least second processing point.

7. The method of claim 1 wherein the signal comprises a digital speech signal.

8. The method of claim 1 wherein the partially processed signal comprises a portion of coded bits.

9. The method of claim 1 wherein the partially processed signal comprises a portion of information bits and a portion of coded bits.

10. The method of claim 1 wherein the limited capacity communication path operably couples at least two subsystems of a digital cellular communication infrastructure system.

11. A method for facilitating throughput of a digital signal over a communication path comprising:
    (a) algorithmically generating a partially redundant coded signal at a first processing point with an algorithm;
    (b) communicating at least a portion of the partially redundant coded signal over a limited capacity communication path to at least a second processing point remotely located from the first processing point; and
    (c) algorithmically continuing redundant coding of that partially redundant coded signal at the at least second processing point by using an algorithm whose functional purpose is substantially related to the algorithm.

12. The method of claim 11 wherein the algorithm used in the step of algorithmically generating comprises a channel coding process selected from the group consisting of systematic linear block coding, nonsystematic linear block coding, systematic convolutional coding, and nonsystematic convolutional coding.

13. The method of claim 11 wherein the algorithm used in the step of algorithmically continuing redundant coding comprises a channel coding process selected from the group consisting of systematic linear block coding, nonsystematic linear block coding, systematic convolutional coding, and nonsystematic convolutional coding.

14. The method in claim 13 wherein the channel coding process used in the step of algorithmically generating allows a portion of the digital signal to be determined from contents of the communicated portion of the partially redundant coded signal.

15. A method of facilitating throughput of a signal over a communication path in a cellular communication system comprising:
   (a) partially channel coding at least a part of a digital signal at a first processing point wherein a portion of error correction bits are generated resulting in a partially channel coded signal;
   (b) communicating bits of the partially channel coded signal in order of a first needed basis, over a limited capacity communication path to an at least second processing point; and
   (c) continuing the channel coding of the digital signal at the at least second processing point.

16. The method of claim 15 wherein the digital signal comprises a digital speech signal intended to be communicated between a switch site and a cell site in a digital cellular radio communication system.

17. A transmitter for facilitating throughput of a processed signal over a limited capacity communication path comprising:
   (a) generating means for generating a partially processed signal having redundant bits by applying a first algorithm to at least a portion of a signal; and
   (b) transmitting means, operably coupled to the generating means, for transmitting at least a portion of the partially processed signal over the limited capacity communication path to a processing point remotely located from the transmitter, the generating means applying the first algorithm to at least a portion of the signal such that the partially processed signal is capable of being subjected to continuing processing at the processing site with a second algorithm whose functional purpose is substantially related to the first algorithm.

18. The transmitter of claim 17 wherein the signal comprises a digital speech signal.

19. The transmitter of claim 18 wherein the digital speech signal is generated at a cellular radio speech processing site.

20. The transmitter of claim 17 wherein the generating means comprises means for generating the partially processed signal by channel coding at least a portion of the signal.

21. A receiver for facilitating throughput of a processed signal over a limited capacity communication path comprising:
   (a) receiving means for receiving a partially processed signal having redundant bits from a remotely located transmitter, the partially processed signal being derived from the application of a first algorithm to a signal; and
   (b) processing means, operably coupled to the receiving means, for continuing processing of the partially processed signal with a second algorithm whose functional purpose is substantially related to the first algorithm applied to the partially processed signal.

22. The receiver of claim 21 wherein the partially processed signal comprises a partially channel coded signal.

23. The receiver of claim 22 wherein the processing means processes the partially channel coded signal with the second algorithm to generate a substantially channel coded signal by generating at least a remaining portion of channel coded redundant bits not previously received by the receiving means.

24. The receiver of claim 22 wherein the processing means processes the partially channel coded signal with the second algorithm to generate a substantially channel coded signal by generating a remaining portion of information bits not previously received by the receiving means.

* * * * *